(12) United States Patent
Gong

(10) Patent No.: US 10,444,478 B2
(45) Date of Patent: Oct. 15, 2019

(54) ULTRA-SHORT THROW PROJECTION OPTICAL SYSTEM

(71) Applicant: UNION OPTECH CO., LTD., Zhongshan, Guangdong (CN)

(72) Inventor: Junqiang Gong, Guangdong (CN)

(73) Assignee: UNION OPTECH CO., LTD., Zhongshan (CN)

( * ) Notice: Subject to any disclaimer, the term of this patent is extended or adjusted under 35 U.S.C. 154(b) by 21 days.

(21) Appl. No.: 15/937,844

(22) Filed: Mar. 27, 2018

(65) Prior Publication Data

US 2018/0284403 A1 Oct. 4, 2018

(30) Foreign Application Priority Data

Mar. 28, 2017 (CN) .......................... 2017 1 0192098

(51) Int. Cl.
*G02B 9/00* (2006.01)
*G02B 13/24* (2006.01)
*G02B 13/00* (2006.01)
*G02B 9/64* (2006.01)
*G02B 17/08* (2006.01)
*G03B 21/14* (2006.01)
*G03B 21/28* (2006.01)
*G03B 21/00* (2006.01)

(52) U.S. Cl.
CPC ............. *G02B 13/24* (2013.01); *G02B 9/64* (2013.01); *G02B 13/0045* (2013.01); *G02B 17/08* (2013.01); *G03B 21/008* (2013.01); *G03B 21/142* (2013.01); *G03B 21/28* (2013.01)

(58) Field of Classification Search
CPC ...... G02B 13/24; G02B 9/64; G02B 13/0045; G02B 17/08; G03B 21/008; G03B 21/142; G03B 21/02
USPC .......................................... 359/364, 649–651
See application file for complete search history.

(56) References Cited

U.S. PATENT DOCUMENTS

2011/0026111 A1* 2/2011 Nagatoshi .............. G02B 17/08
359/364

* cited by examiner

*Primary Examiner* — William Choi

(57) ABSTRACT

The present invention discloses an ultra-short throw projection optical system, where an illumination system, a refractive lens component, and an aspherical reflector are sequentially disposed in a projection direction. The present invention provides a high resolution, implements a throw ratio below 0.18, and has no diffused focus at a high temperature, and the present invention implements that a resolution is not reduced and a distortion does not become larger at different throw distances.

9 Claims, 2 Drawing Sheets

ULTRA-SHORT THROW PROJECTION OPTICAL SYSTEM

CROSS REFERENCE TO RELATED APPLICATIONS

The present application claims the benefit of Chinese Patent Application No. 201710192098.9 filed on Mar. 28, 2017. All the above are hereby incorporated by reference.

BACKGROUND

Technical Field

The present invention relates to projection technologies in the industry of optical display, and in particular, to an ultra-short throw projection optical system.

Related Art

In recent years, with the development of projection technologies, projectors have been widely applied to fields such as household, education, and offices. Ultra-short throw projection is capable of projecting a large-size picture in a case of short-distance projection and is favored by a large quantity of users.

Currently, a ultra-short throw projection lens on the market are designed in two manners: 1, using a refractive retrofocus lens structure, where a lens has a large volume, there is relatively a large quantity of lens to be used; to correct a distortion and a field curvature, a resolution needs to be sacrificed, and consequently, the resolution is relatively low, a manufacturing tolerance is sensitive, and the lens cannot be produced in batches; 2, using a mixed structure, that is, a refractive lens component plus a reflective lens group, where a current ultra-short lens using the structure usually has a relatively low resolution, a throw ratio, and low brightness; when a throw distance changes, the field curvature and the distortion apparently become larger, and consequently, a resolving power gets worse, and a range of throw distances is relatively small; although resolutions of a minority of lenses achieve 1080 P, to improve the resolution, the throw ratio is sacrificed, and relatively many aspherical surfaces are added, and consequently, a manufacturing yield is low, and the lens cannot be produced in batches; a minority of lenses use plastic aspherical surfaces to reduce costs, and consequently, the lenses have focuses diffused because of heating due to a high temperature when a projector is used for a long time. Currently, there is no ultra-short lens capable of overcoming the foregoing defect on the market.

Therefore, the present invention is generated based on the foregoing shortcoming.

SUMMARY

A technical problem to be resolved by the present invention is to provide an ultra-short throw projection optical system, where the system has a high resolution, high brightness, no diffused focus at a high temperature, and a large range of throw distances, a resolving power is not lowered at different throw distances, a distortion does not become larger, and the system can be produced in batches.

Compared with the prior art, the ultra-short throw projection optical system in the present invention achieves the following effects:

1. The present invention provides a high resolution, implements a throw ratio below 0.18, and has no diffused focus at a high temperature.
2. The present invention implements that a resolution is not reduced and a distortion does not become larger at different throw distances.
3. The present invention dramatically lowers an assembly sensitivity degree by reasonably allocating a system focal power, so that batch production can be performed.

BRIEF DESCRIPTION OF THE DRAWINGS

Specific implementations of the present invention are further described in detail below with reference to the accompanying drawings.

Descriptions for the accompanying drawings: 100, illumination system; 110, DMD chip; 120, equivalent prism; 200, refractive lens component; 210, first lens group; 220, second lens group; 230, third lens group; 240, fourth lens group; 300, aspherical reflector; 1, first lens; 2, second lens; 3, third lens; 4, fourth lens; 5, fifth lens; 6, sixth lens; 7, seventh lens; 8, eighth lens; 9, ninth lens; 10, tenth lens; 11, eleventh lens; 12, twelfth lens; 13, thirteen lens; 14, diaphragm.

DETAILED DESCRIPTION

The implementations of the present invention are described in detail below with reference to the accompanying drawings.

Figure 1:
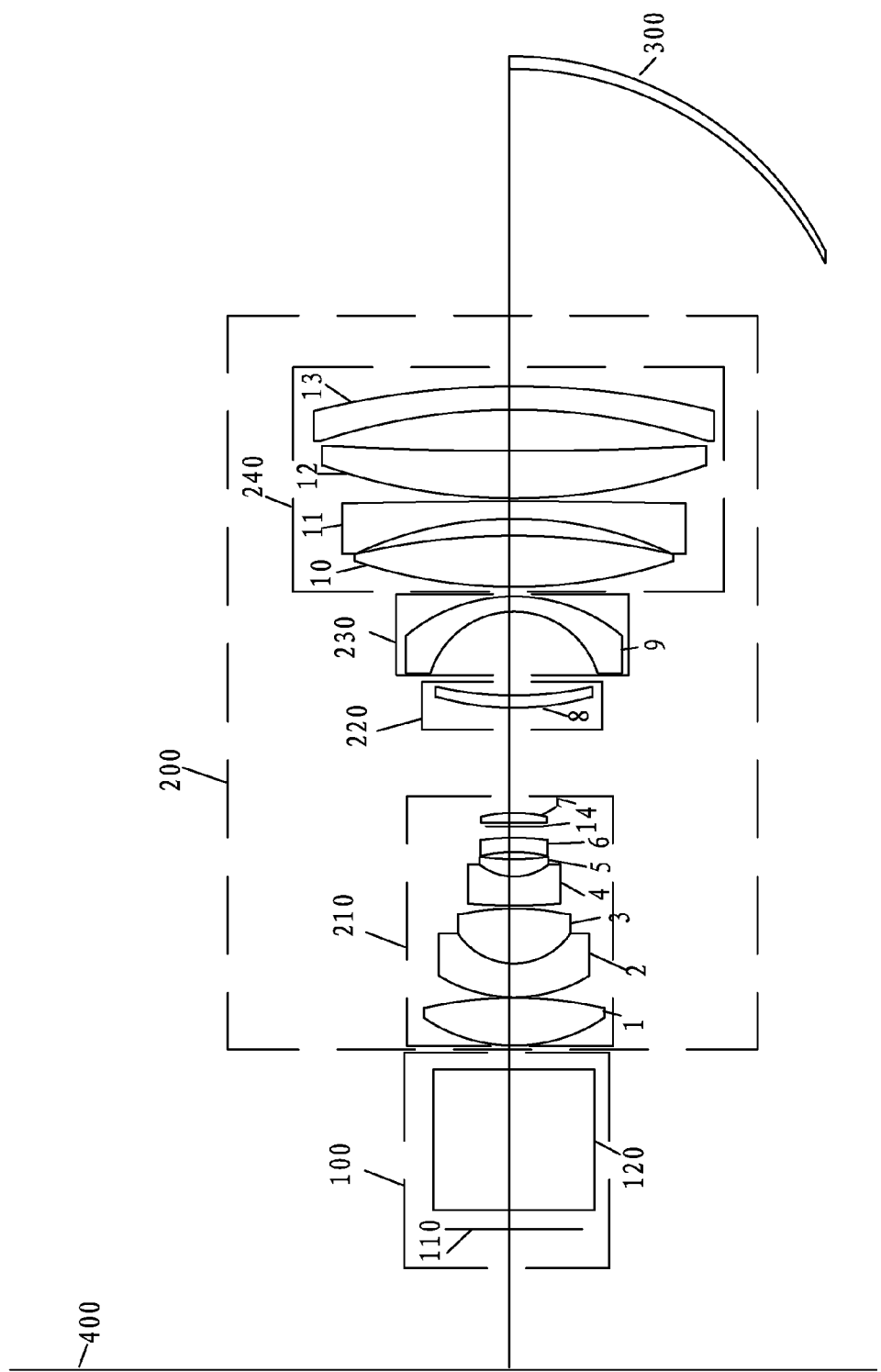
FIG. 1 is a schematic diagram according to the present invention.
Figure 2:
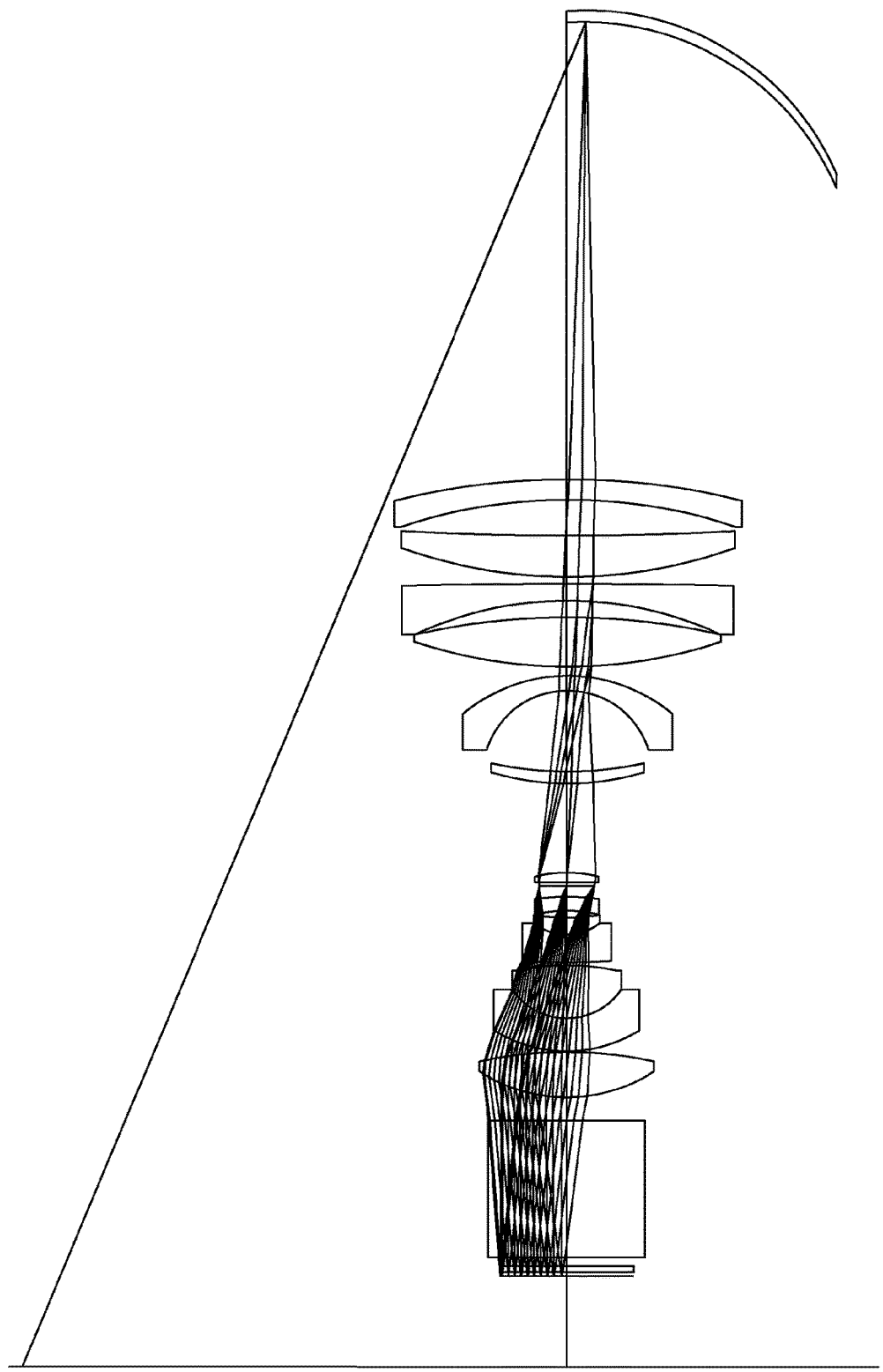
FIG. 2 is a schematic diagram of an optical path according to the present invention.

As shown in FIG. 1 and FIG. 2, an ultra-short throw projection optical system is provided, where an illumination system 100, a refractive lens component 200, and an aspherical reflector 300 are sequentially disposed in a projection direction; the illumination system 100 includes a DMD chip 110 and an equivalent prism 120; and the refractive lens component 200 includes:

a first lens group 210 capable of moving forward and backward relative to the DMD chip 110, where a focal power of the first lens group 210 is positive; the first lens group can move forward and backward relative to the DMD chip, to compensate a variation of a back focus when a lens is assembled;

a second lens group 220 capable of moving forward and backward relative to the DMD chip 110, where a focal power of the second lens group 220 is positive;

a third lens group 230 capable of moving forward and backward relative to the DMD chip 110, where a focal power of the third lens group 230 is negative; and the third lens group and the second lens group are a linkage group and move together relative to the DMD chip 110; and a fourth lens group 240 that is static relative to the DMD chip 110, where a focal power of the fourth lens group 240 is positive.

As shown in FIG. 1 and FIG. 2, in this embodiment, the first lens group 210 includes a first lens 1, a second lens 2, a third lens 3, a fourth lens 4, a fifth lens 5, a sixth lens 6, a diaphragm 14, and a seventh lens 7 that are sequentially disposed in a projection direction; the second lens group 220 includes an eighth lens 8; two surfaces of the eighth lens 8 are both bent towards the aspherical reflector 300; the third lens group 230 includes a ninth lens 9; and the fourth lens group 240 includes a tenth lens 10, an eleventh lens 11, a twelfth lens 12, and a thirteen lens 13 that are sequentially disposed in a projection direction.

As shown in FIG. 1, in this embodiment, the DMD chip 110 is placed deviated from an optical axis, so that a deviation distance between a center of the DMD chip 110 and the optical axis is 0.8 mm-1 mm. As a result, an emergent ray of the refractive lens component 200 after passing through the aspherical reflector 300 does not interfere with the refractive lens component; the DMD chip is 0.65 inch, and a resolution thereof is 1920*1080.

As shown in FIG. 1 and FIG. 2, in this embodiment, the focal power of the first lens group 210 satisfies $0.03 \leq |\varphi_{210}| \leq 0.04$; the focal power of the second lens group 220 satisfies $0.004 \leq |\varphi_{220}| \leq 0.005$; the focal power of the third lens group 230 satisfies $0.03 \leq |\varphi_{230}| \leq 0.035$; the focal power of the fourth lens group 240 satisfies $0.007 \leq |\varphi_{240}| \leq 0.008$; and a focal power of the aspherical reflector 300 satisfies $0.03 \leq |\varphi_{300}| \leq 0.033$. When the lens groups are allocated according to the focal powers, a throw ratio below 0.18 can be implemented, focuses are not diffused at a high temperature, a sensitivity degree of a system assembly tolerance can be dramatically lowered, and batch production can be performed.

The focal power of the third lens group is negative; the focal power of the second lens group is positive; the third lens group and the second lens group synchronously move; the focal powers of the third lens group and the second lens group satisfy $6.5 \leq |\varphi_{230}/\varphi_{220}| \leq 6.8$; the third lens group uses glass aspherical surfaces, and two surfaces are both bent towards the DMD chip; the second lens group 220 has glass aspherical surfaces, and two surfaces both face backward the DMD chip; after the foregoing conditions are satisfied, a conjugate distance variation at different throw distances can be compensated, a relatively large range of throw ranges can be implemented, and field curvatures and distortions at different throw distances can be corrected, so that resolutions at different throw distances are kept unchanged.

As shown in FIG. 1 and FIG. 2, in this embodiment, a focal power $\varphi_{11}$ of the eleventh lens 11 is negative, a focal power $\varphi_{10}$ of the tenth lens 10 is positive, and the focal powers satisfy $0.8 \leq |\varphi_{11}/\varphi_{10}| \leq 0.9$; a focal power $\varphi_{13}$ of the thirteen lens 13 is negative, a focal power $\varphi_{12}$ of the twelfth lens 12 is positive, and the focal powers satisfy $0.2 \leq |\varphi_{13}/\varphi_{12}| \leq 0.3$. The size of the aspherical reflector can be reduced, so that an optical system has a small volume.

As shown in FIG. 1 and FIG. 2, in this embodiment, a focal power of the sixth lens 6 is negative, and the focal power $\varphi_6$ satisfies $0.008 \leq |\varphi_6| \leq 0.009$; two surfaces of the sixth lens 6 are both bent towards the DMD chip, so that a diaphragm spherical aberration and coma aberration produced by the diaphragm can be corrected, a height of a rear group of rays can be increased, a relatively large aperture can be implemented, and projected picture brightness can be improved; a focal power of the fifth lens 5 is positive; a focal power of the fourth lens 4 is negative, and the focal powers satisfy $0.04 \leq |\varphi_4/\varphi_5| \leq 0.041$, and refractive indexes satisfy $0.3 \leq ND_4-ND_5 \leq 0.4$; two surfaces of the fourth lens 4 are both bent towards the aspherical reflector 300; a focal power of the third lens 3 is positive; a focal power of the second lens 2 is negative, the focal powers satisfy $0.014 \leq |\varphi_2/\varphi_3| \leq 0.016$, and refractive indexes satisfy $0.4 \leq ND_2-ND_3 \leq 0.43$. A high-order aberration of the system can be dramatically lowered, a system resolution is improved, a sensitivity degree of the system for an aberration is lowered, and batch production can be implemented. The first lens 1 uses glass aspherical surfaces and corrects distortions and astigmation produced by other lenses of the system, so that the system finally obtains a high-quality image.

As shown in FIG. 1 and FIG. 2, in this embodiment, the second lens 2 and the third lens 3 are glued by using an optical glue, and the fourth lens 4 and the fifth lens 5 are glued by using an optical glue.

As shown in FIG. 1 and FIG. 2, in this embodiment, the first lens 1, the sixth lens 6, the eighth lens 8, the ninth lens 9, and the aspherical reflector 300 are glass aspherical lenses.

As shown in FIG. 1 and FIG. 2, in this embodiment, aspherical surface shapes of the first lens 1, the sixth lens 6, the eighth lens 8, the ninth lens 9, and the aspherical reflector 300 satisfy an equation:

$$z = cy^2 / \{1 + \sqrt{1-(1+k)c^2y^2}\} + a_1y^2 + a_2y^4 + a_3y^6 + a_4y^8 + a_5y^{10} + a_6y^{12} + a_7y^{14} + a_8y^{16},$$

where in the equation, a parameter c is a curvature corresponding to a radius, y is a radial coordinate whose unit is the same as a lens length unit, and k is a conical quadratic curve coefficient; when the k coefficient is less than −1, a surface-shaped curve of the lens is a hyperbola; when the k coefficient is equal to −1, the surface-shaped curve of the lens is a parabola; when the k coefficient is between −1 and 0, the surface-shaped curve of the lens is an ellipse; when the k coefficient is equal to 0, the surface-shaped curve of the lens is a circle; when the k coefficient is greater than 0, the surface-shaped curve of the lens is oblate; $\alpha 1$ to $\alpha 8$ respectively represent coefficients corresponding to radial coordinates.

The following case shows actual design parameters of an ultra-short lens whose throw ratio is 0.18 and resolution is 1080 P:

| Surface No. | Type | Radius R | Thickness | Optical material | Aperture |
|---|---|---|---|---|---|
| OBJ | Object surface | Infinity | 420 | | 3624 |
| S1 | Aspherical | −61.76 | −178.18 | MIRROR | 161.8 |
| S2 | Standard | −139.99 | −4 | H- | 68.2 |
| S3 | Standard | −104.17 | −7 | LAF50B | 65.7 |
| S4 | Standard | 592.744 | −8.080 | H- | 65.4 |
| S5 | Standard | 97.06 | −0.50 | LAF52 | 64.9 |
| S6 | Standard | −1177.991 | −3 | E-FDS1 | 58.5 |
| S7 | Standard | −64.11877 | −2.8 | | 54.2 |
| S8 | Standard | −118.9531 | −8.719 | H-LAF52 | 54.2 |
| S9 | Standard | 85.28803 | 1.624 | | 53.8 |
| S10 | Aspherical | −20.47599 | −2.591348 | D-ZK3 | 36.8 |
| S11 | Aspherical | −9.452421 | −14.28962 | | 28.4 |
| S12 | Aspherical | 67.22973 | −2.112007 | D-K9L | 26.8 |
| S13 | Aspherical | 42.84396 | −17.91 | | 26.2 |
| S14 | Standard | −23.98976 | −1.690106 | E-FDS1 | 11.1 |
| S15 | Standard | 687.8847 | −0.62355 | | 10.5 |
| STO | Diaphragm | infinity | −1.910 | | 9.66 |
| S17 | Aspherical | −46.03844 | −2.484195 | M- | 10.6 |
| S18 | Aspherical | −26.97438 | −1.22 | BACD12 | 11.32 |
| S19 | Standard | 37.86655 | −2.94 | H-ZK3 | 11.36 |
| S20 | Standard | 9.429451 | −4.947 | TAFD25 | 11.67 |
| S21 | Standard | 101.3821 | −0.519 | | 15.68 |
| S22 | Standard | −42.53202 | −9.33 | FCD1 | 17.54 |
| S23 | Standard | 11.56574 | −5.76 | FDS1 | 19.16 |
| S24 | Standard | 24.30685 | −0.12 | | 30.2 |
| S25 | Aspherical | −54.52 | −8.12 | M-BACD5N | 30.7 |
| S26 | Aspherical | 20.8 | −4.1 | | 27.5 |
| S27 | Standard | Infinity | −24 | H-K9L | 23.9 |
| S28 | Standard | Infinity | −1.4 | | 23.6 |
| IMA | Image surface | infinity | | | 23.5 |

Coefficients of an aspherical reflector S1 are:
k: −1.484
a1: 0
a2: −4.1775889e-008
a3: −1.7469322e-011
a4: 1.7400545e-015
a5: −1.3744689e-019
a6: 5.819994e-024
a7: −9.0128358e-029
Coefficients of a first surface S10 of the ninth lens 9 are:
k: −1.209079
a1: 0
a2: 1.4598802e-005
a3: 7.3836402e-009
a4: −1.0722255e-010
a5: 2.2856103e-013
a6: −2.2696405e-016
a7: 5.7114412e-020
Coefficients of a second surface S11 of the ninth lens 9 are:
k: −0.7290704
a1: 0
a2: 3.2176776e-005
a3: 1.5832509e-007
a4: 5.9875149e-011
a5: −8.0436318e-013
a6: 2.8736159e-015
a7: 4.7557297e-018
Coefficients of a first surface S12 of the eighth lens 8 are:
k: 14.41962
a1: 0
a2: 7.714615e-007
a3: −4.3287749e-009
a4: −3.2946437e-011
a5: −9.887032e-014
a6: −1.4271619e-015
a7: −6.8875224e-018
a8: −1.7003567e-020
Coefficients of a second surface S13 of the eighth lens 8 are:
k: −0.7130752
a1: 0
a2: −1.4711743e-006
a3: 4.3075608e-009
a4: −4.7317027e-011
a5: −2.0277632e-013
a6: −1.4895262e-016
a7: 1.5629029e-018
a8: −7.1817264e-020
Coefficients of a first surface S17 of the sixth lens 6 are:
k: 21.03896
a1: 0
a2: −7.4996101e-005
a3: 9.4385801e-007
a4: −2.6751325e-008
a5: −4.8054944e-010
a6: 2.7932337e-011
a7: −3.046491e-013
Coefficients of a second surface S18 of the sixth lens 6 are:
k: 0.6876403
a1: 0
a2: −4.9595905e-005
a3: 2.787858e-007
a4: 1.0856431e-008
a5: −1.5897707e-010
a6: −1.7977373e-011
a7: 4.0060191e-013
Coefficients of a first surface S25 of the first lens 1 are:
k: −1.789004
a1: 0
a2: 8.263905e-006
a3: −1.7911823e-008
a4: 3.7017951e-011
a5: 4.6598193e-014
a6: 7.4790277e-017
a7: 6.4726266e-019
Coefficients of a second surface S26 of the first lens 1 are:
k: −0.5580475
a1: 0
a2: −2.9634338e-005
a3: 2.3313592e-008
a4: −5.5797887e-011
a5: 1.3393404e-013
a6: 2.4826738e-016
a7: 6.2566959e-019

A projection range of an ultra-short throw projection lens is 0.35 m to 0.6 m. When the ultra-short throw projection lens focuses, the first lens group is moved to adjust a back focus, and an adjustment range is ±0.1 mm. After the back focus is adjusted, the first lens group is kept still, and the second lens group and the third lens group move together for focusing. During focusing, change ranges of intervals between the lens groups are as follows: an interval between the first lens group and the second lens group is 17.1 mm to 19.28 mm, an interval between the second lens group and the third lens group is 14.6 mm to 13.5 mm, and an interval between the third lens group and the fourth lens group is 2.0 mm to 1.0 mm.

What is claimed is:

1. An ultra-short throw projection optical system, wherein an illumination system (100), a refractive lens component (200), and an aspherical reflector (300) are sequentially disposed in a projection direction; the illumination system (100) comprises a DMD chip (110) and an equivalent prism (120); and the refractive lens component (200) comprises:
a first lens group (210) capable of moving forward and backward relative to the DMD chip (110), wherein a focal power of the first lens group (210) is positive;
a second lens group (220) capable of moving forward and backward relative to the DMD chip (110), wherein a focal power of the second lens group (220) is positive;
a third lens group (230) capable of moving forward and backward relative to the DMD chip (110), wherein a focal power of the third lens group (230) is negative; and
a fourth lens group (240) that is static relative to the DMD chip (110), wherein a focal power of the fourth lens group (240) is positive.

2. The ultra-short throw projection optical system according to claim 1, wherein the first lens group (210) comprises a first lens (1), a second lens (2), a third lens (3), a fourth lens (4), a fifth lens (5), a sixth lens (6), a diaphragm (14), and a seventh lens (7) that are sequentially disposed in a projection direction; the second lens group (220) comprises an eighth lens (8); the third lens group (230) comprises a ninth lens (9); and the fourth lens group (240) comprises a tenth lens (10), an eleventh lens (11), a twelfth lens (12), and a thirteen lens (13) that are sequentially disposed in a projection direction.

3. The ultra-short throw projection optical system according to claim 2, wherein a focal power $\varphi_{11}$ of the eleventh lens (11) is negative, a focal power $\varphi_{10}$ of the tenth lens (10) is positive, and the focal powers satisfy $0.8 \leq |\varphi_{11}/\varphi_{10}| \leq 0.9$; a focal power $\varphi_{13}$ of the thirteen lens (13) is negative, a focal power $\varphi_{12}$ of the twelfth lens (12) is positive, and the focal powers satisfy $0.2 \leq |\varphi_{13}/\varphi_{12}| \leq 0.3$.

4. The ultra-short throw projection optical system according to claim 2, wherein a focal power of the sixth lens (6) is negative, and the focal power $\varphi_6$ satisfies $0.008 \leq |\varphi_6| \leq 0.009$; two surfaces of the sixth lens (6) are both bent towards the DMD chip (110); a focal power of the fifth lens (5) is positive; a focal power of the fourth lens (4) is negative, and two surfaces of the fourth lens (4) are both bent towards the aspherical reflector (300), the focal powers satisfy $0.04 \leq |\varphi_4/\varphi_5| \leq 0.041$, and refractive indexes satisfy $0.3 \leq (ND_4 - ND_5) \leq 0.4$; a focal power of the third lens (3) is positive; a focal power of the second lens (2) is negative, two surfaces of the second lens (2) are both bent towards the aspherical reflector (300), the focal powers satisfy $0.014 \leq |\varphi_2/\varphi_3| \leq 0.016$, and refractive indexes satisfy $0.4 \leq (ND_2 - ND_3) \leq 0.43$.

5. The ultra-short throw projection optical system according to claim 2, wherein the first lens (1), the sixth lens (6), the eighth lens (8), the ninth lens (9), and the aspherical reflector (300) are glass aspherical lenses.

6. The ultra-short throw projection optical system according to claim 4, wherein the second lens (2) and the third lens (3) are glued by using an optical glue, and the fourth lens (4) and the fifth lens (5) are glued by using an optical glue.

7. The ultra-short throw projection optical system according to claim 5, wherein aspherical surface shapes of the first lens (1), the sixth lens (6), the eighth lens (8), the ninth lens (9), and the aspherical reflector (300) satisfy an equation:

$$z = cy^2 / \{1 + \sqrt{1-(1+k)c^2y^2}\} + a_1y^2 + a_2y^4 + a_3y^6 + a_4y^8 + a_5y^{10} + a_6y^{12} + a_7y^{14} + a_8y^{16},$$

wherein
in the equation, a parameter c is a curvature corresponding to a radius, y is a radial coordinate whose unit is the same as a lens length unit, and k is a conical quadratic curve coefficient; when the k coefficient is less than −1, a surface-shaped curve of the lens is a hyperbola; when the k coefficient is equal to −1, the surface-shaped curve of the lens is a parabola; when the k coefficient is between −1 and 0, the surface-shaped curve of the lens is an ellipse; when the k coefficient is equal to 0, the surface-shaped curve of the lens is a circle; when the k coefficient is greater than 0, the surface-shaped curve of the lens is oblate; α1 to α8 respectively represent coefficients corresponding to radial coordinates.

8. The ultra-short throw projection optical system according to claim 1, wherein the DMD chip (110) is placed deviated from an optical axis, so that a deviation distance between a center of the DMD chip (110) and the optical axis is 0.8 mm-1 mm.

9. The ultra-short throw projection optical system according to claim 1, wherein the focal power of the first lens group (210) satisfies $0.03 \leq |\varphi_{210}| \leq 0.04$; the focal power of the second lens group (220) satisfies $0.004 \leq |\varphi_{220}| \leq 0.005$; the focal power of the third lens group (230) satisfies $0.03 \leq |\varphi_{230}| \leq 0.035$; the focal power of the fourth lens group (240) satisfies $0.007 \leq |\varphi_{240}| \leq 0.008$; and a focal power of the aspherical reflector (300) satisfies $0.03 \leq |\varphi_{300}| \leq 0.033$.

\* \* \* \* \*